United States Patent
Schubert et al.

(10) Patent No.: US 10,818,958 B2
(45) Date of Patent: Oct. 27, 2020

(54) BATTERY CELL AND BATTERY SYSTEM

(71) Applicant: Robert Bosch GmbH, Stuttgart (DE)

(72) Inventors: Gerhard Schubert, Strullendorf (DE); Holger Reinshagen, Bamberg (DE); Martin Gerlach, Strullendorf (DE); Michael Austen, Bamberg (DE); Silvan Poller, Neisseaue Ot Kaltwasser (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 15/546,691

(22) PCT Filed: Jan. 28, 2016

(86) PCT No.: PCT/EP2016/051746
§ 371 (c)(1),
(2) Date: Jul. 27, 2017

(87) PCT Pub. No.: WO2016/120358
PCT Pub. Date: Aug. 4, 2016

(65) Prior Publication Data
US 2018/0013167 A1 Jan. 11, 2018

(30) Foreign Application Priority Data
Jan. 30, 2015 (DE) .................. 10 2015 201 658

(51) Int. Cl.
*H01M 10/04* (2006.01)
*H01M 2/14* (2006.01)
*H01M 2/02* (2006.01)

(52) U.S. Cl.
CPC ..... *H01M 10/0486* (2013.01); *H01M 2/0237* (2013.01); *H01M 2/14* (2013.01); *H01M 10/0431* (2013.01); H01M 2220/20 (2013.01)

(58) Field of Classification Search
CPC ......... H01M 10/0486; H01M 10/0431; H01M 2/14; H01M 2/0237
See application file for complete search history.

(56) References Cited

U.S. PATENT DOCUMENTS

2006/0115722 A1* 6/2006 Kim ................. H01M 2/263
429/161
2010/0028770 A1 2/2010 Ryu et al.
(Continued)

FOREIGN PATENT DOCUMENTS

CN 101176223 A 5/2008
CN 101304103 A 11/2008
(Continued)

OTHER PUBLICATIONS

International Search Report for Application No. PCT/EP2016/051746 dated May 9, 2016 (English Translation, 2 pages).

*Primary Examiner* — Osei K Amponsah
(74) *Attorney, Agent, or Firm* — Michael Best & Friedrich LLP

(57) ABSTRACT

The invention relates to a battery cell (2), comprising a prismatically designed cell housing with a cover surface (31), on which a negative terminal (11) and a positive terminal (12) are arranged, and an electrode coil (10) arranged within the cell housing and comprising a cathode (14) and an anode (16). The electrode coil (10) is fixed to the cover surface (31) by means of an electrically insulating holder (70), and the holder (70) is connected to at least one electrically insulating spacer (67, 68) which is fastened to the cover surface (31). The invention also relates to a battery system which comprises at least one battery cell (2) according to the invention.

14 Claims, 7 Drawing Sheets

(56) References Cited

U.S. PATENT DOCUMENTS

| | | | |
|---|---|---|---|
| 2011/0183181 A1* | 7/2011 | Moon | H01M 2/0237 |
| | | | 429/136 |
| 2011/0210954 A1 | 9/2011 | Murphy et al. | |
| 2013/0029188 A1* | 1/2013 | Kim | H01M 2/0217 |
| | | | 429/53 |
| 2013/0288092 A1 | 10/2013 | Nidelkoff et al. | |
| 2014/0377607 A1* | 12/2014 | Urano | H01M 10/0431 |
| | | | 429/94 |

FOREIGN PATENT DOCUMENTS

| | | | | |
|---|---|---|---|---|
| DE | 102013200555 | | 7/2014 | |
| EP | 2398088 | | 12/2011 | |
| EP | 2551940 | | 1/2013 | |
| EP | 2675000 | | 12/2013 | |
| EP | 2808925 | | 12/2014 | |
| JP | 2013-101773 | * | 5/2013 | ............ H01M 10/04 |
| JP | 2014-022102 | * | 1/2014 | .............. H01M 4/02 |
| WO | 2016120358 | | 8/2016 | |

* cited by examiner

BATTERY CELL AND BATTERY SYSTEM

BACKGROUND OF THE INVENTION

The present invention relates to a battery cell and to a battery system.

It is evident that, in future, whether in stationary applications such as wind turbine installations, in motor vehicles which are configured as hybrid vehicles or electric vehicles, or in electronic devices such as laptop computers or mobile phones, new battery systems will be employed which will be subject to very stringent requirements with respect to reliability, safety, performance capability and service life.

So-called Lithium-ion battery cells are specifically employed for this purpose. These are characterized, amongst other features, by high energy densities, thermal stability and extremely low self-discharge capability. Lithium-ion battery cells have a positive and a negative electrode upon which, during a charging process and also during a discharging process, lithium ions can be reversibly deposited and also released again. A process of this type is also described as intercalation/deintercalation.

In general, a battery cell comprises one or more electrode units, which are configured in the form of a coil. An electrode unit incorporates two foil-type electrodes, namely an anode and a cathode. The electrodes are wound, with the interposition of a separator, to form an electrode coil, which is also described as a jelly-roll. The two electrodes in the electrode coil are electrically connected to the poles of the battery cell, which are also described as terminals, by means of collectors.

A battery cell further comprises a cell housing which is comprised, for example, of aluminum. The cell housing is generally configured as a prism, specifically as a cuboid, and is of pressure-resistant design. Further to the connection of the electrodes to the terminals, the cell housing is filled with an electrolyte solution.

A generic battery cell with an electrode coil is known from EP 2 675 000 A1. The anode and the cathode project from opposing sides of the electrode coil, parallel to the winding axis, and are each connected to a collector. The two collectors are oriented essentially perpendicularly to the winding axis of the electrode coil, and connect the anode and the cathode to the terminals.

A further generic battery cell is known from US 2010/0028770 A1. The electrodes of the electrode coil have contact lugs which project from the electrode coil and are connected to collectors. Prior to the connection with the collectors, the contact lugs are of different lengths.

For the electrical insulation of the electrodes and the cell housing, insulators are provided which are, for example, of plastic construction. An electrode coil with corresponding insulators for a battery cell is disclosed in US 2013/0288092 A1.

Lithium-ion battery cells are relatively sensitive to environmental influences, specifically to air and humidity. The aforementioned cell housing provides protection against said environmental influences. A plurality of such battery cells can be combined to form a battery system, which is also described as a battery pack.

SUMMARY OF THE INVENTION

A battery cell is proposed, comprising a prismatically-designed cell housing having a cover surface, on which a negative terminal and a positive terminal are arranged, and at least one electrode coil arranged within the cell housing and having a cathode and an anode.

According to the invention, the at least one electrode coil is fastened to the cover surface by means of an electrically-insulating holder, wherein the holder is connected to at least one electrically-insulating spacer.

Advantageously, the spacer is fastened to the cover surface.

Preferably, the spacer is secured to the cover surface by a collector, which electrically connects the cathode or the anode to a terminal, specifically by clamping.

According to an advantageous embodiment of the invention, the holder is configured as a frame-type structure, and the at least one electrode coil is lodged in the holder.

A winding axis, around which the electrode coil is wound, is preferably oriented in parallel with the cover surface of the cell housing.

According to a further advantageous embodiment of the invention, the holder has a cover region, which is connected to the spacer, and a base region, which is connected to the cover region, and the at least one electrode coil is held between the cover region and the base region.

The at least one electrode coil, at least to a near-complete extent, is surrounded by the holder.

According to a further advantageous embodiment of the invention, the holder is configured as a planar object, and the at least one electrode coil is wound around the holder.

A winding axis, around which the at least one electrode coil is wound, is preferably oriented at right-angles to the cover surface of the cell housing.

According to a further advantageous embodiment of the invention, the holder is configured in the form of a double frame. The holder thus comprises a first frame element and a second frame element, between which the at least one electrode coil is accommodated.

Advantageously, and in the interests of assembly, the holder is configured in a one-piece arrangement with the at least one electrically-insulating spacer.

A battery system is also proposed, comprising at least one battery cell according to the invention.

A battery cell according to the invention can be advantageously employed in an electric vehicle (EV), a hybrid electric vehicle (HEV) or a plug-in hybrid electric vehicle (PHEV).

The assembly of the battery cell is advantageously simplified if the at least one electrode coil is fastened to a holder on the cover surface of the cell housing. Upon the fitting of the cover surface to the remainder of the cell housing, the at least one electrode coil is automatically inserted in the interior of the cell housing. For the attachment of the holder, spacers are employed, which are prefitted and which serve for the insulation of the collectors against the cell housing. Said collectors, which connect the cathode and the anode to the terminals of the battery cell, thus provide the mechanical attachment of the spacers to the cover surface, and clamp the spacers to the cover surface.

BRIEF DESCRIPTION OF THE DRAWINGS

Forms of embodiment of the invention are described in greater detail, with reference to the drawings and the following description.

Herein.

DETAILED DESCRIPTION

Figure 1:
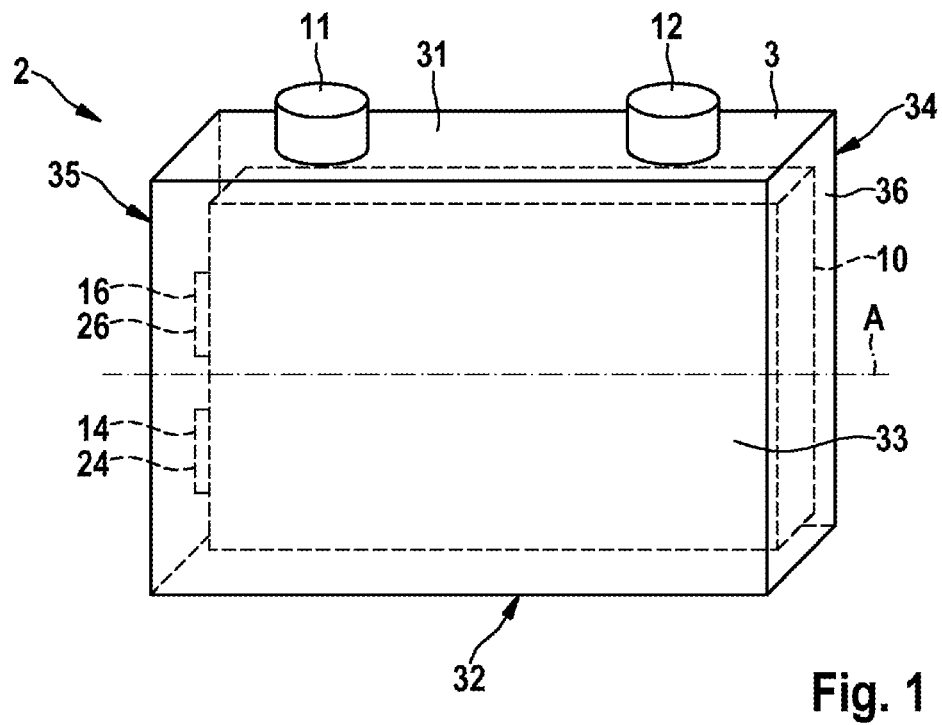
FIG. 1 shows a schematic, perspective and semi-transparent representation of a battery cell, without collectors.

A battery cell 2 comprises a cell housing 3, which is configured as a prism and, in the present case, as a cuboid. In the present case, the cell housing 3 is of electrically-conductive design and is manufactured, for example, from aluminum. It is also conceivable that the cell housing 3 is manufactured from an electrically-insulating material, for example plastic, or is coated with an electrically-insulating material.

The battery cell 2 comprises a negative terminal 11 and a positive terminal 12. A voltage delivered by the battery cell 2 can be tapped-off via the terminals 11, 12. Moreover, the battery cell 2 can also be charged via the terminals 11, 12.

The cuboid-shaped cell housing 3 of the battery 2 has six sides with three different surface areas wherein, in each case, sides of equal surface area are arranged in mutually-opposing pairs. The sides with the largest surface area are described hereinafter as the first front surface 33 and the second front surface 34. The sides with the smallest surface area are described hereinafter as the first end surface 35 and the second end surface 36. The remaining sides, of intermediate surface area, are described hereinafter as the cover surface 31 and the base surface 32.

The terminals 11, 12 are arranged, with a mutual spacing, on the cover surface 31 of the cell housing 3. The negative terminal 11 is arranged adjacently to the first end surface 35, and the positive terminal 12 is arranged adjacently to the second end surface 36.

Within the cell housing 3 of the battery cell 2, an electrode coil 10 is arranged, which comprises two electrodes, namely a cathode 14 and an anode 16. The cathode 14 and the anode 16 are configured as foil-type electrodes and, with the interposition of a first separator 18 and a second separator 19, are wound around a winding axis A of the electrode coil 10. The electrode coil 10 is arranged in the cell housing 3 such that the winding axis A is oriented perpendicularly to the end surfaces 35, 36.

It is also conceivable that the battery cell 2 comprises a plurality of electrode coils 10 which are electrically connected in parallel or, in the presence of sufficient insulation, in series. Moreover, an electrolyte is present within the cell housing 3.

The anode 16 has a plurality of anode contact lugs 26, which are electrically connected to the negative terminal 11 of the battery cell 2. The cathode 14 has a plurality of cathode contact lugs 24, which are electrically connected to the positive terminal 12 of the battery cell 2. The anode contact lugs 26 and the cathode contact lugs 24 project out adjacently from the electrode coil 10 on the same end surface, and extend from the electrode coil 10 to the first end surface 35 of the cell housing 3.

Between the anode contact lugs 26 and the cathode contact lugs 24 of the electrode coil 10, an insulating film is arranged, which is not represented here, and which electrically insulates the anode contact lugs 26 of the anode 16 from the cathode contact lugs 24 of the cathode 14. In the present case, the insulating film forms part of one of the separators 18, 19, which are provided between the anode 16 and the cathode 14 of the electrode coil 10.

For the electrical connection of the anode 16 to the negative terminal 11, a first collector 41 is provided. The first collector 41 has a first region 42, which is oriented in parallel with the first end surface 35 and adjacent to the first end surface 35, and is connected to the anode contact lugs 26 of the anode 16. The first region 42 of the first collector 41 extends to the cover surface 31, and forms a transition to a second region 43, which is oriented in parallel with the cover surface 31. The second region 43 of the first collector 41 is connected to the negative terminal 11. Electrical insulators are provided between the first collector 41 and the cell housing 3 of the battery cell 2.

For the electrical connection of the cathode 14 to the positive terminal 12, a second collector 51 is provided. The second collector 51 has a first region 52, which is oriented in parallel with the first end surface 35 adjacent to the first end surface 35, and is connected to the cathode contact lugs 24 of the cathode 14. The second collector 51 has a second region 53, which is connected to the positive terminal 12.

Figure 2:
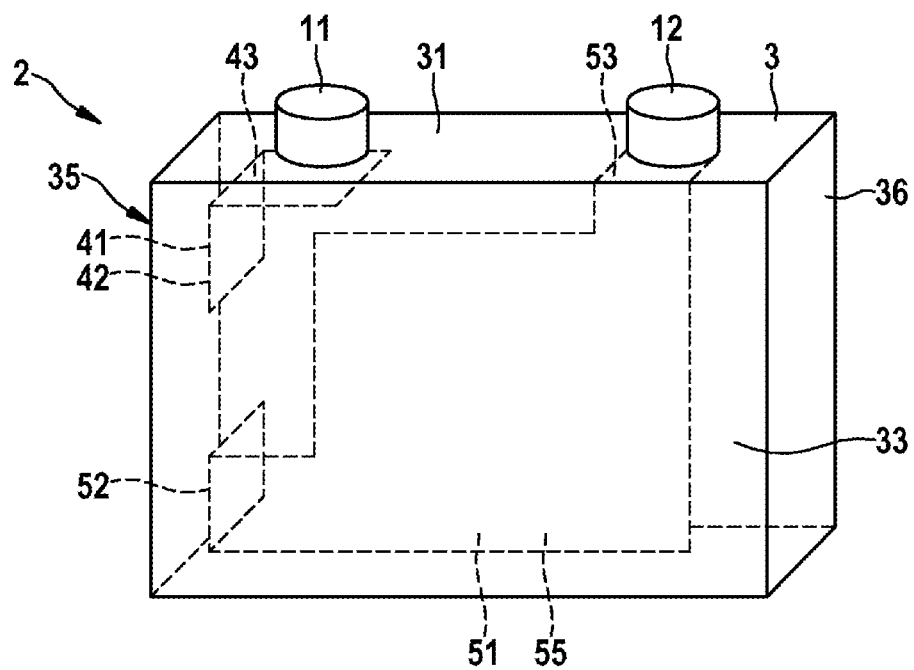
FIG. 2 shows a schematic, perspective and semi-transparent representation of a battery cell according to a first form of embodiment, without electrode coil.

According to a first form of embodiment of the battery cell 2, which is represented in FIG. 2, the second collector 51 has a central region 55, which is connected to the first region 52 and to the second region 53. The central region 55 of the second collector 51 extends in parallel with the front surfaces 33, 34. In the present case, the central region 55 of the second collector 51 is arranged between the electrode coil 10 and the first front surface 33. Electrical insulators are provided between the second collector 51 and the cell housing 3 of the battery cell 2.

The central region 55 of the second collector 51 can also be arranged between the electrode coil 10 and the second front surface 34. Two parallel-oriented central regions 55 of the second collector 51 can also be provided, which are arranged on either side of the electrode coil 10.

Figure 3:
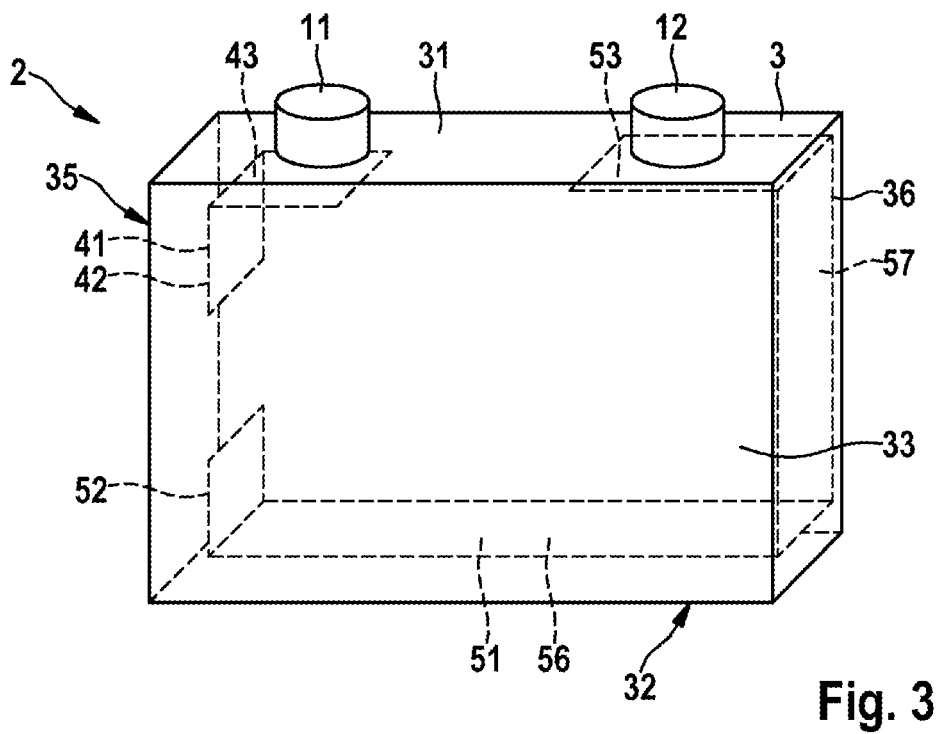
FIG. 3 shows a schematic, perspective and semi-transparent representation of a battery cell according to a second form of embodiment, without electrode coil.

According to a second form of embodiment of the battery cell 2, which is represented in FIG. 3, the second collector 51 has a lower region 56, which is connected to the first region 52. The second collector 51 moreover has a rear region 57, which is connected to the second region 53. The lower region 56 of the second collector 51 is connected to the rear region 57 of the second collector 51.

The lower region 56 of the second collector 51 extends from the first region 52 of the second collector 51, in parallel with the base surface 32 between the electrode coil 10 and the base surface 32, to the second end surface 36. The rear region 57 of the second collector 51 extends from the second region 53 of the second collector 51, in parallel with the second end surface 36 between the electrode coil 10 and the second end surface 36, to the base surface 32. The rear region 57 of the second collector 51 is further connected to the lower region 56 of the second collector 51. Electrical insulators are likewise provided between the second collector 51 and the cell housing 3 of the battery cell 2.

According to a further form of embodiment of the battery cell 2, which is not represented here, the electrically-conductive cell housing 3 is electrically connected to the positive terminal 12. In this case, no insulator is required between the second collector 51 and the cell housing 3.

Alternatively, the electrically-conductive cell housing 3 is electrically connected to the negative terminal 11. In this case, no insulator is required between the first collector 41 and the cell housing 3.

It is moreover conceivable for the positive terminal 12 and the cathode contact lugs 24 of the cathode 14 to be electrically connected to the cell housing 3. In this case, the cell housing 3 would assume the function of the second collector 51, namely the electrical connection of the cathode 14 to the positive terminal 12. In this case, the second collector 51 could be entirely omitted. It is also conceivable that the second collector 51 electrically connects the cathode contact lugs 24 of the cathode 14 to the first end surface 35 of the cell housing 3.

Alternatively, it is conceivable for the negative terminal 11 and the anode contact lugs 26 of the anode 16 to be electrically connected to the cell housing 3. In this case, the cell housing 3 would assume the function of the first collector 41, namely the electrical connection of the anode 14 to the negative terminal 11. In this case, the first collector 41 could be entirely omitted. It is also conceivable that the first collector 41 electrically connects the anode contact lugs 26 of the anode 16, for example, to the first end surface 35 of the cell housing 3.

Figure 4:
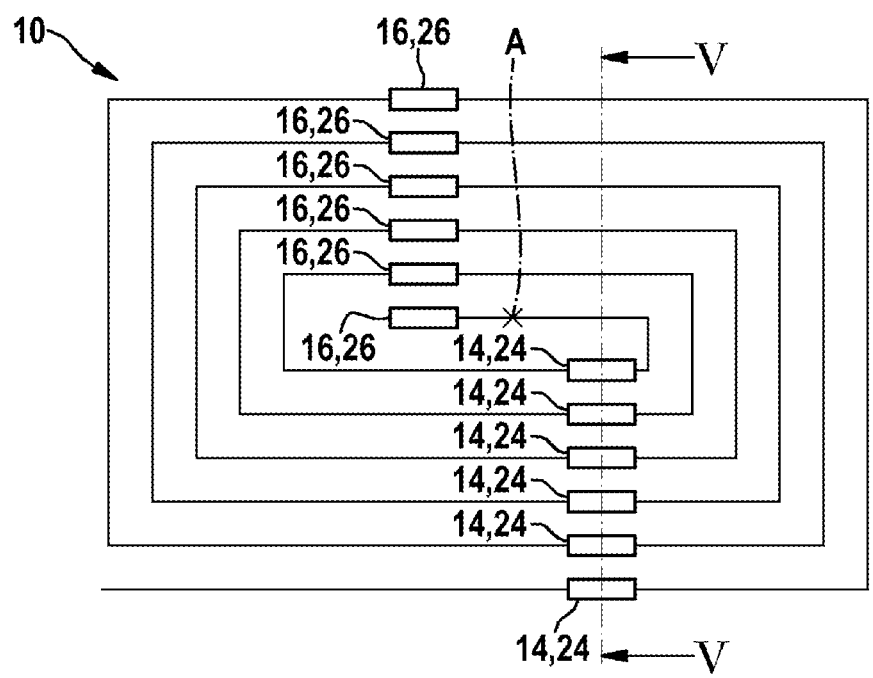
FIG. 4 shows an overhead view of an end face of an electrode coil, prior to installation in a cell housing.

FIG. 4 shows an overhead view of an end surface of the electrode coil 10, prior to the installation in the cell housing 3 of the battery cell 2. The anode contact lugs 26 of the anode 16 project out of the electrode coil 10 in a near-parallel orientation to the winding axis A. The anode contact lugs 26 of the anode 16 are mutually aligned on a line in a direction which is perpendicular to the winding axis A. The cathode contact lugs 24 of the cathode 14 project out of the electrode coil 10 in a near-parallel orientation to the winding axis A. The cathode contact lugs 24 of the cathode 14 are mutually aligned on a line in a direction which is perpendicular to the winding axis A.

Figure 5A:
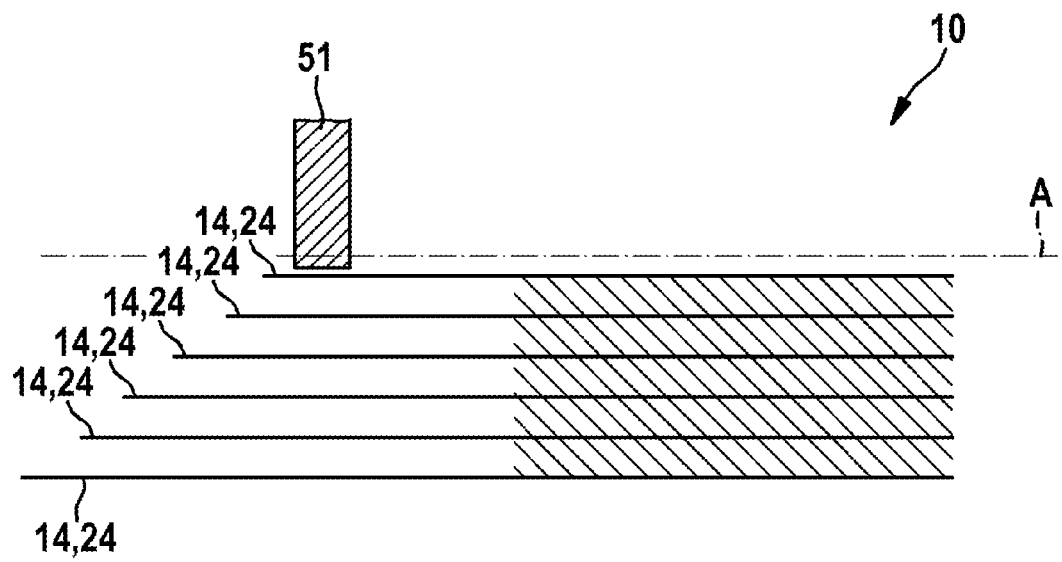
FIG. 5a shows a partial sectional representation of the electrode coil represented in FIG. 4, along the section line V-V, prior to connection with a collector.

FIG. 5a shows a partial sectional representation of the electrode coil 10 represented in FIG. 4, along the section line V-V. The part of the electrode coil 10 which incorporates the cathode contact lugs 24 of the cathode 14, prior to connection with the second collector 51, is represented. The second collector 51 is oriented perpendicularly to the winding axis A of the electrode coil 10.

The individual cathode contact lugs 24 of the cathode 14 are of different lengths. The cathode contact lug 24 which is facing the winding axis A is of the shortest length. The length of the cathode contact lugs 24 increases as the clearance of said cathode contact lugs 24 from the winding axis A increases. The cathode contact lug 24 which is averted from the winding axis A is of the longest length.

Figure 5B:
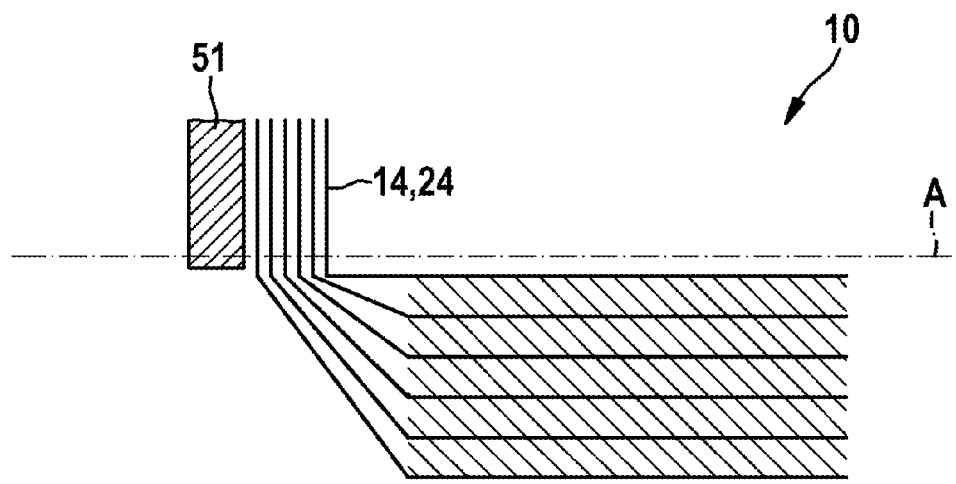
FIG. 5b shows the electrode coil represented in FIG. 5a, after connection with the collector.

FIG. 5b shows the electrode coil 10 represented in FIG. 5a, after connection with the second collector 51. The individual cathode contact lugs 24 of the cathode 14 are each curved around an axis which is oriented perpendicularly to the winding axis A, and are arranged one on top of another. The cathode contact lug 24 of the cathode 14 which is averted from the winding axis A is in contact with the second collector 51. The cathode contact lugs 24 of the cathode 14 are interconnected, and are connected to the second collector 51, specifically by welding.

The lengths of the individual cathode contact lugs 24 of the cathode 14 are mutually tailored, such that the ends of the cathode contact lugs 24 which are averted from the electrode coil 10 converge with each other, after the connection of the cathode contact lugs 24 with the second collector 51.

Figure 6A:
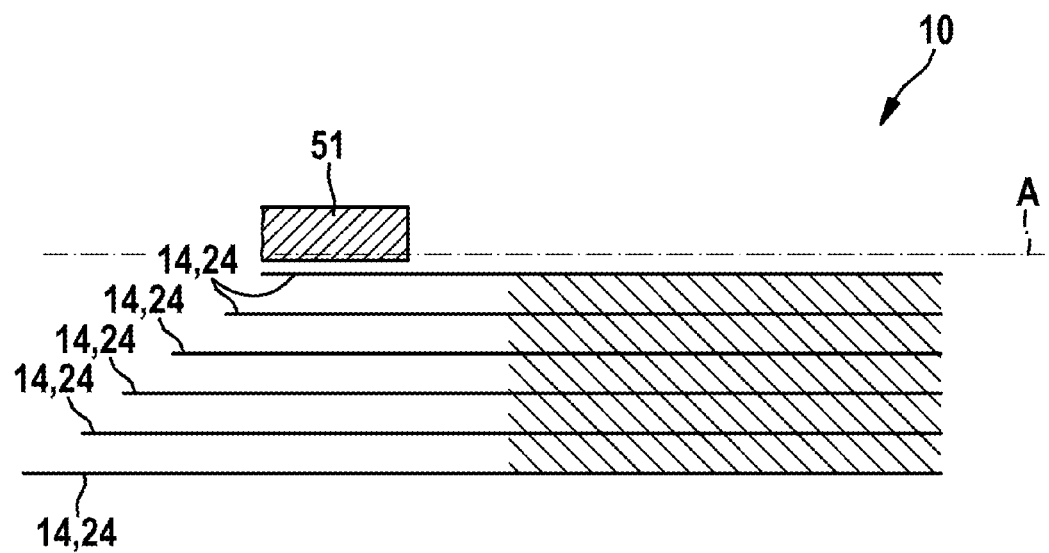
FIG. 6a shows a variation of the electrode coil represented in FIG. 5a, prior to connection with a collector.

FIG. 6a shows a variation of the electrode coil 10 represented in FIG. 5a, prior to connection with the second collector 51. The second collector 51 is oriented in parallel with the winding axis A of the electrode coil 10.

In said variation of the electrode coil 10, the individual cathode contact lugs 24 of the cathode 14 are of different lengths. The cathode contact lug 24 which is facing the winding axis A and the second collector 51 is of the shortest length. The length of the cathode contact lugs 24 increases as the clearance of said cathode contact lugs 24 from the winding axis A and from the second collector 51 increases. The cathode contact lug 24 which is averted from the winding axis A and from the second collector 51 is of the longest length.

Figure 6B:
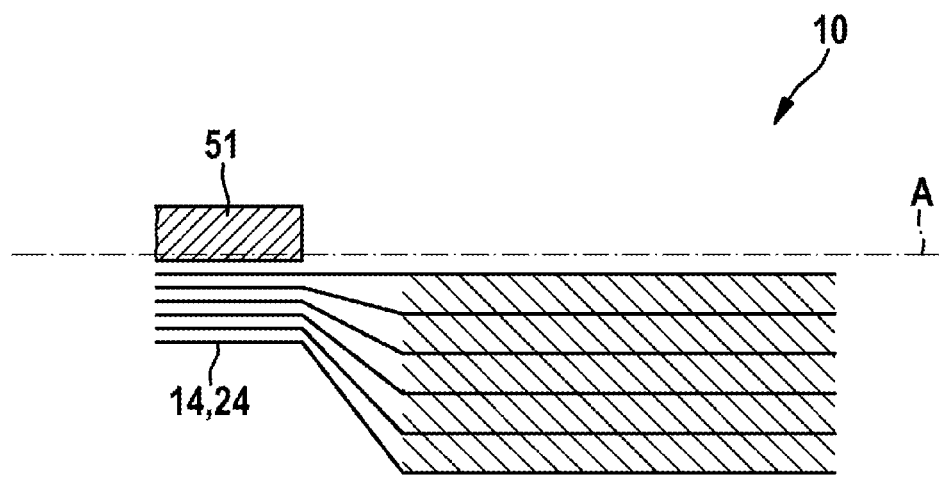
FIG. 6b shows the electrode coil represented in FIG. 6a, after connection with the collector.

FIG. 6b shows the electrode coil 10 represented in FIG. 6a, after connection with the second collector 51. The individual cathode contact lugs 24 of the cathode 14 are arranged one on top of another. The cathode contact lug 24 of the cathode 14 which is averted from the winding axis A is in contact with the second collector 51. The cathode contact lugs 24 of the cathode 14 are interconnected, and are connected to the second collector 51, specifically by welding.

In said variation of the electrode coil 10, the lengths of the individual cathode contact lugs 24 of the cathode 14 are mutually tailored, such that the ends of the cathode contact lugs 24 which are averted from the electrode coil 10 converge with each other, after the connection of the cathode contact lugs 24 with the second collector 51.

Figure 7:
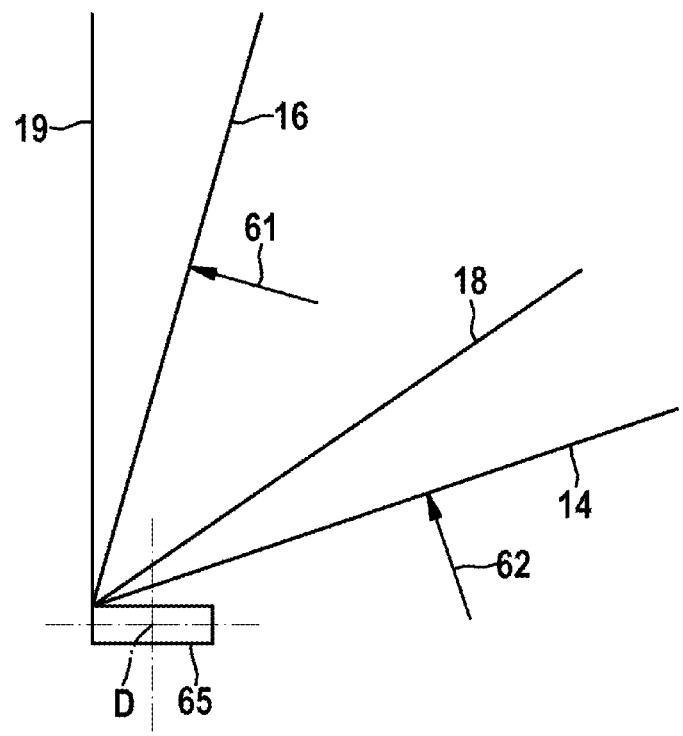
FIG. 7 shows a schematic representation of the manufacture of an electrode coil.

FIG. 7 shows a schematic representation of the manufacture of the electrode coil 10. A winding core 65 is rotated around an axis of rotation D. A cathode 14 of foil-type design, a first separator 18 of foil-type design, an anode 16 of foil-type design and a second separator 19 of foil-type design are attached to the winding core 65. The axis of rotation D of the winding core 65 is aligned with the winding axis A of the electrode coil 10.

By the rotation of the winding core 65, the cathode 14, the first separator 18, the anode 16 and the second separator 19 are wound onto the winding core 65. One of the separators 18, 19 is thus arranged respectively between the cathode 14 and the anode 16.

A first laser beam 61 cuts off an edge region of the foil-type anode 16. However, the anode contact lugs 26 of the anode 16 are set in place. After one full rotation of the winding core 65 respectively, one of the anode contact lugs 26 of the anode 16 is set in place. This ensures that the anode contact lugs 26 of the anode 16, as represented in FIG. 4, are mutually aligned on a line.

The length of the set anode contact lugs 26 of the anode 16 increases with each rotation. Thus, the anode contact lug 26 of the anode 16 which is facing the axis of rotation D and the winding axis A has the shortest length, and the anode contact lug 26 of the anode 16 which is averted from the axis of rotation D and from the winding axis A has the longest length.

A second laser beam 62 cuts off an edge region of the foil-type cathode 14. However, the cathode contact lugs 24 of the cathode 14 are set in place. After one full rotation of the winding core 65 respectively, one of the cathode contact lugs 24 of the cathode 14 is set in place. This ensures that the cathode contact lugs 24 of the cathode 14, as represented in FIG. 4, are mutually aligned on a line.

The length of the set cathode contact lugs 24 of the cathode 14 increases with each rotation. Thus, the cathode contact lug 24 of the cathode 14 which is facing the axis of rotation D and to the winding axis A has the shortest length, and the cathode contact lug 24 of the cathode 14 which is averted from the axis of rotation D and from the winding axis A has the longest length, as represented in FIG. 5a.

Once the cathode 14, the anode 16 and the separators 18, 19 are fully wound, the winding core 65 can be removed. The electrode coil 10 can then be gently compressed together, such that the void left by the absent winding core 65 is closed.

Figure 8:
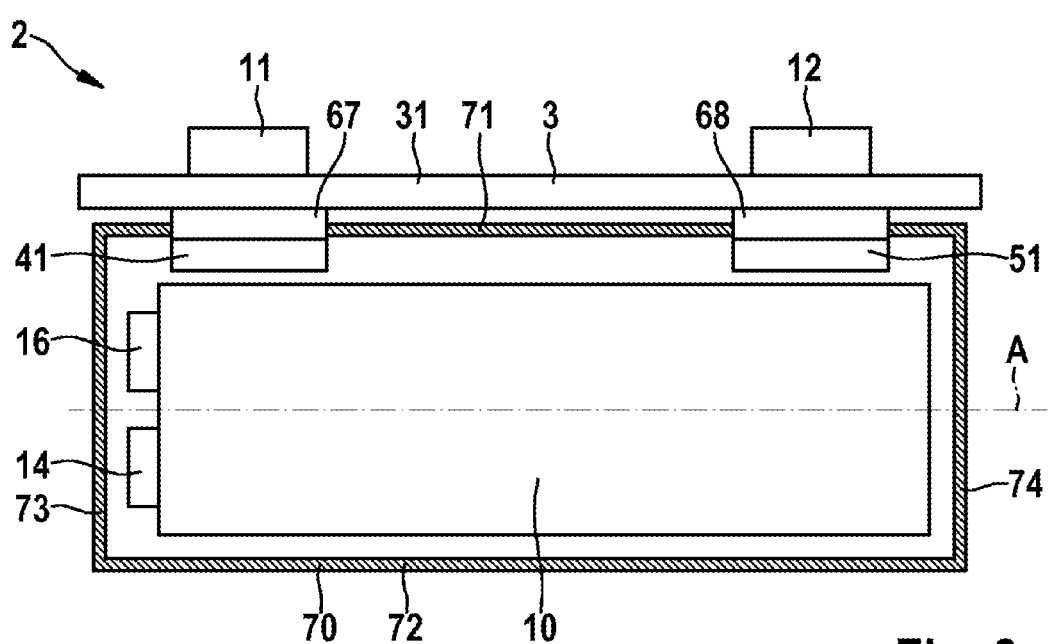
FIG. 8 shows a schematic sectional representation of a battery cell with a first form of embodiment of a holder for the electrode coil.

FIG. 8 shows a schematic sectional representation of a battery cell 2 with a holder 70 according to a first form of embodiment for an electrode coil 10. The collectors 41, 51 are not fully represented.

The holder 70 according to a first form of embodiment is configured as a rectangular frame, and is formed of a non-electrically-conductive material, specifically of a plastic. The holder 70 according to the first form of embodiment comprises a first long side 71 and a second long side 72, which is oriented in parallel with the first long side 71. The first long side 71 and the second long side 72 are interconnected at their ends by a first short side 73 and a second short side 74. The first short side 73 and the second short side 74 are mutually parallel, and are oriented at right-angles to the long sides 71, 72.

The first long side 71 of the frame-type holder 70, according to the first form of embodiment, is fastened to the cover surface 31 of the cell housing 3 of the battery cell 2. From the ends of the first long side 71 of the holder 70, according to the first form of embodiment, the first short side 73 and the second short side 74 project at right-angles from the cover surface 31 to the unrepresented base surface 32 of the cell housing 3. The first short side 73 is thus oriented adjacently to the unrepresented first end surface 35 of the cell housing 3, and the second short side 74 is oriented adjacently to the unrepresented second end surface 36 of the cell housing 3. The second long side 72 is oriented adjacently to the unrepresented base surface 32 of the cell housing 3.

The electrode coil 10 is clamped in the frame-type holder 70 according to the first form of embodiment. The winding axis A of the electrode coil 10 is thus oriented in parallel with the long sides 71, 72 of the holder 70 according to the first form of embodiment, and in parallel with the cover surface 31 of the cell housing 3. The anode 16 and the cathode 14 project from the electrode coil 10, adjacent to the first short side 73 of the holder 70 according to the first form of embodiment.

The first collector 41 of the battery cell 2 is electrically and mechanically connected to the negative terminal 11. A first spacer 67 is arranged between the first collector 41 and the cover surface 31 of the cell housing 3. The first spacer 67 is formed of a non-electrically-conductive material, specifically of a plastic, and electrically insulates the first collector 41 from the cover surface 31 of the cell housing 3. The first spacer 67 is thus mechanically attached to the cover surface 31 on the interior of the cell housing 3.

The second collector 51 of the battery cell 2 is electrically and mechanically connected to the positive terminal 12. A second spacer 68 is arranged between the second collector 51 and the cover surface 31 of the cell housing 3. The second spacer 68 is formed of a non-electrically-conductive material, specifically of a plastic, and electrically insulates the second collector 51 from the cover surface 31 of the cell housing 3. The second spacer 68 is thus mechanically attached to the cover surface 31 on the interior of the cell housing 3.

The first long side 71 of the holder 70 according to the first form of embodiment is mechanically connected to the first spacer 67 and to the second spacer 68. The first long side 71 of the holder 70 according to the first form of embodiment, in the manner of a clip-on connection, is compressed into corresponding recesses in the spacers 67, 68, and is retained therein in a form-fitting manner. It is also conceivable that the holder 70 according to the first form of embodiment is configured in a one-piece arrangement with the spacers 67, 68.

Figure 9:
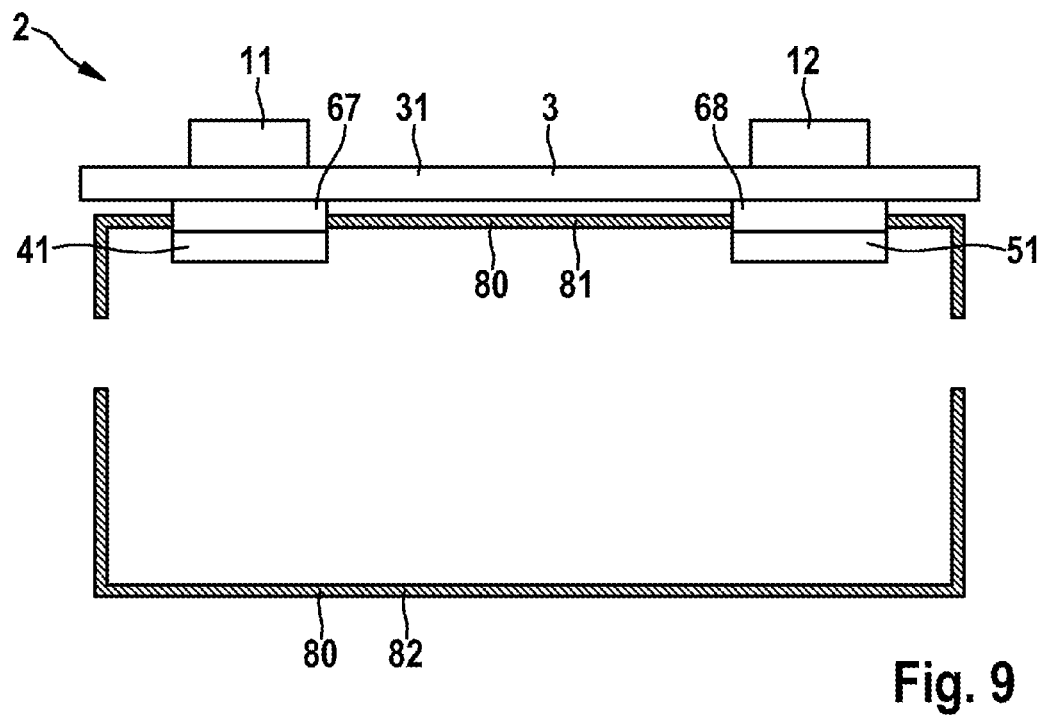
FIG. 9 shows a schematic sectional representation of a battery cell with a second form of embodiment of a holder for the electrode coil.

FIG. 9 shows a schematic sectional representation of a battery cell 2 with a holder 80 according to a second form of embodiment for an unrepresented electrode coil 10. The collectors 41, 51 are not fully represented.

The holder 80 according to the second form of embodiment is configured in the form of an at least substantially closed box, and is formed of a non-electrically-conductive material, specifically of a plastic. The holder 80 according to the second form of embodiment comprises a cover region 81 and a base region 82.

The cover region 81 of the holder 80 according to the second form of embodiment is fastened to the cover surface 31 of the cell housing 3 of the battery cell 2. In the representation shown, the base region 82 is arranged with a clearance from the cover region 81. The base region 82, after connection of the unrepresented electrode coil 10, is compressed against the cover region 81 and latches onto the cover region 81 in a form-fitting manner. The unrepresented electrode coil 10 is then surrounded by the holder 80 configured in the form of a box according to the second form of embodiment.

The first collector 41 of the battery cell 2 is electrically and mechanically connected to the negative terminal 11. A first spacer 67 is arranged between the first collector 41 and the cover surface 31 of the cell housing 3. The first spacer 67 is formed of a non-electrically-conductive material, specifically of a plastic, and electrically insulates the first collector 41 from the cover surface 31 of the cell housing 3. The first spacer 67 is thus mechanically attached to the cover surface 31 on the interior of the cell housing 3.

The second collector 51 of the battery cell 2 is electrically and mechanically connected to the positive terminal 12. A second spacer 68 is arranged between the second collector 51 and the cover surface 31 of the cell housing 3. The second spacer 68 is formed of a non-electrically-conductive material, specifically of a plastic, and electrically insulates the second collector 51 from the cover surface 31 of the cell housing 3. The second spacer 68 is thus mechanically attached to the cover surface 31 on the interior of the cell housing 3.

The cover region 81 of the holder 80 according to the second form of embodiment is mechanically connected to the first spacer 67 and to the second spacer 68. The cover region 81 comprises clips which, in the manner of a clip-on connection, are compressed into corresponding recesses in the spacers 67, 68, and are retained therein in a form-fitting manner. It is also conceivable that the cover region 81 is configured in a one-piece arrangement with the spacers 67, 68.

Figure 10:
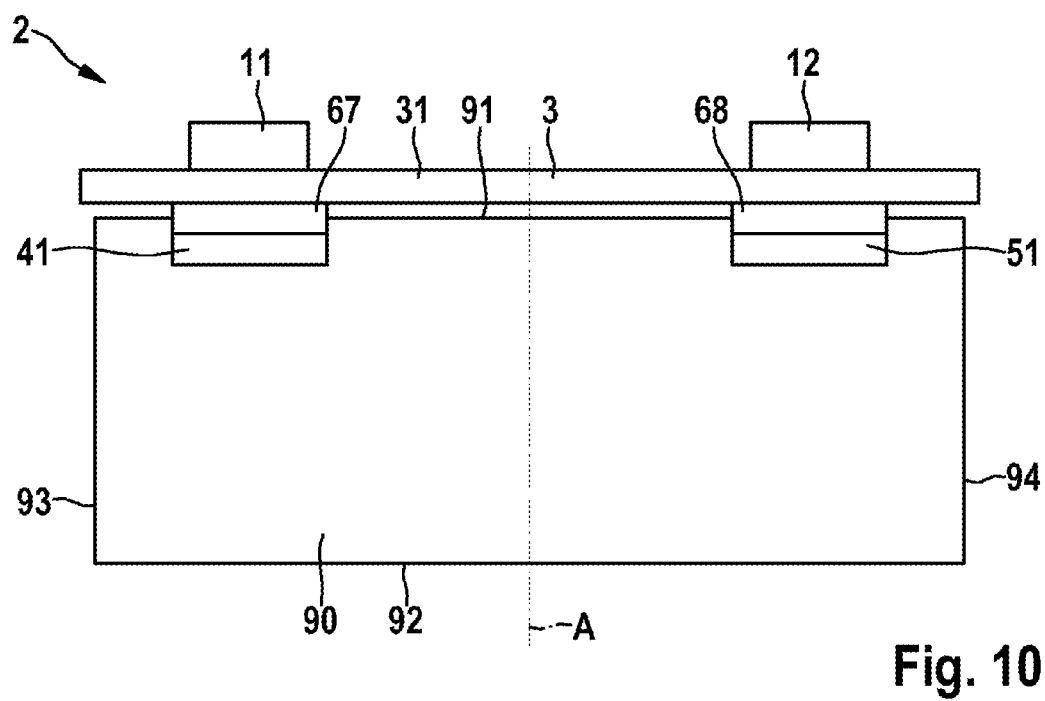
FIG. 10 shows a schematic sectional representation of a battery cell with a third form of embodiment of a holder for the electrode coil.

FIG. 10 shows a schematic sectional representation of a battery cell 2 with a holder 90 according to a third form of embodiment for an unrepresented electrode coil 10. The collectors 41, 51 are not fully represented.

The holder 90 according to the third form of embodiment is configured as a rectangular planar object, and is formed of a non-electrically-conductive material, specifically of a plastic. The holder 90 according to the third form of embodiment is delimited by a top side 91, a base side 92 which is oriented in parallel with the top side 91, a first outer side 93 and a second outer side 94. The first outer side 93 and the second outer side 94 are oriented in a mutually parallel arrangement, and at right-angles to the top side 91 and the base side 92.

The top side 91 of the holder 90 according to the third form of embodiment is fastened to the cover surface 31 of the cell housing 3 of the battery cell 2. The first outer side 93 and the second outer side 94 project at right-angles from the cover surface 31 to the unrepresented base surface 32 of the cell housing 3. The first outer side 93 is thus oriented adjacently to the unrepresented first end surface 35 of the cell housing 3, and the second outer side 94 is oriented adjacently to the unrepresented second end surface 36 of the cell housing 3. The base side 92 is oriented adjacently to the unrepresented base surface 32 of the cell housing 3.

The unrepresented electrode coil 10 is wound around the holder 90 according to the third form of embodiment. The winding axis A of the electrode coil 10 is thus oriented at right-angles to the top side 91 of the holder 90 according to the third form of embodiment, and at right-angles to the cover surface 31 of the cell housing 3. The anode 16, the cathode 14 and the separators 18, 19 are thus arranged around the outer sides 93, 94 of the holder 90 according to the third form of embodiment.

The first collector 41 of the battery cell 2 is electrically and mechanically connected to the negative terminal 11. A first spacer 67 is arranged between the first collector 41 and the cover surface 31 of the cell housing 3. The first spacer 67 is formed of a non-electrically-conductive material, specifically of a plastic, and electrically insulates the first collector 41 from the cover surface 31 of the cell housing 3. The first spacer 67 is thus mechanically attached to the cover surface 31 on the interior of the cell housing 3.

The second collector 51 of the battery cell 2 is electrically and mechanically connected to the positive terminal 12. A second spacer 68 is arranged between the second collector 51 and the cover surface 31 of the cell housing 3. The second spacer 68 is formed of a non-electrically-conductive material, specifically of a plastic, and electrically insulates the second collector 51 from the cover surface 31 of the cell housing 3. The second spacer 68 is thus mechanically attached to the cover surface 31 on the interior of the cell housing 3.

The top side 91 of the holder 90 according to the third form of embodiment is mechanically connected to the first spacer 67 and to the second spacer 68. The top side 91 of the holder 90 according to the third form of embodiment, in the manner of a clip-on connection, is compressed into corresponding recesses in the spacers 67, 68, and is retained therein in a form-fitting manner. It is also conceivable that the holder 90 according to the third form of embodiment is configured in a one-piece arrangement with the spacers 67, 68.

Figure 11:
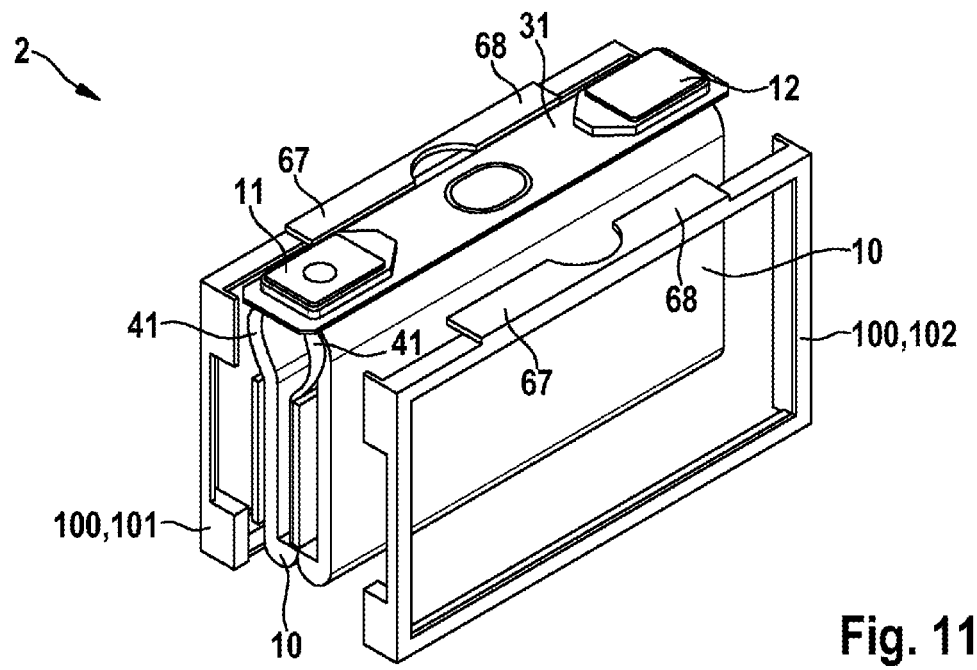
FIG. 11 shows a schematic exploded representation of a battery cell with a fourth form of embodiment of a holder for the electrode coil.

FIG. 11 shows a schematic exploded view of a battery cell 2 with a holder 100 according to a fourth form of embodiment. The holder 100 according to the fourth form of embodiment serves for the accommodation of two electrode coils 10.

The holder 100 according to the fourth form of embodiment is configured in the form of a double frame, and is formed of a non-electrically-conductive material, specifically of a plastic. The holder 100 according to the fourth form of embodiment comprises a first frame element 101 and a second frame element 102, between which the two electrode coils 10 are accommodated. The electrode coils 10 are thus laterally surrounded by the frame elements 101, 102 of the holder 100 according to the fourth form of embodiment.

Each of the two electrode coils 10 comprises an anode 16 and a cathode 14 respectively. The anode contact lugs 26 of the anodes 16 and the cathode contact lugs 24 of the cathodes 14 project out of the electrode coils 10, in an adjacent manner, on the same end face.

An unrepresented insulating film is arranged between the anode contact lugs 26 and the cathode contact lugs 24 of the two electrode coils 10 respectively, which respectively electrically insulates the anode contact lugs 26 from the cathode contact lugs 24. In the present case, the two insulating films each form part of the separators 18, 19 which are provided between the anodes 16 and the cathodes 14 of the two electrode coils 10.

Two first collectors 41 are provided for the electrical connection of the anodes 16 to the negative terminal 11. The anode contact lugs 26 of the anodes 16 of the two electrode coils 10 are connected to one of the first collectors 41 respectively, in the present case by welding. In the present case, the first collectors 41 are formed of copper.

The first collectors 41 extend from the anode contact lugs 26 of the anodes 16, initially parallel to the first end surface 35 and adjacently to the first end surface 35 on the cover surface 31. The first collectors 41 are electrically and mechanically connected to the negative terminal 11.

In the present case, the first collectors 41 are configured as separate parts. The first collectors 41 can also be configured in a one-piece arrangement. In this case, the anode contact lugs 26 of both the electrode coils 10 are connected to one and the same first collector 41.

Two second collectors 51 are provided for the electrical connection of the cathodes 14 to the positive terminal 12. The cathode contact lugs 24 of the cathodes 14 of the two electrode coils 10 are connected to one of the second collectors 51 respectively, in the present case by welding. In the present case, the second collectors 51 are formed of aluminum. The second collectors 51 are oriented in a similar manner to that represented in FIG. 2, but are not shown in the representation according to FIG. 11.

The second collectors 51 each have a first region 52, which is oriented in parallel with the first end surface 35 and adjacent to the first end surface 35, and which is connected to the cathode contact lugs 24 of one of the electrode coils 10. Each of the second collectors 51 furthermore has a second region 53, which is electrically and mechanically connected to the positive terminal 12.

The second collectors 51 each also have a central region 55, which is connected to the first region 52 and to the second region 53. The central regions 55 of the second collectors 51 extend in parallel to the front surfaces 33, 34. The central region 55 of one of the second collectors 51 is arranged between one of the electrode coils 10 and the first front surface 33, and the central region 55 of the other second collector 51 is arranged between the other electrode coil 10 and the second front surface 34. The central regions 55 of the second collectors 51 are thus arranged on either side of the two electrode coils 10.

In the present case, the second collectors 51 are configured as separate parts. The second collectors 51 can also be configured in a one-piece arrangement. To this end, the respective second region 53 of the two second collectors 51 are interconnected.

A first spacer 67 is arranged between the first collectors 41 and the cover surface 31 of the cell housing 3. The first spacer 67 is formed of a non-electrically-conductive material, specifically of a plastic, and electrically insulates the first collectors 41 from the cover surface 31 of the cell housing 3. The first spacer 67 is thus mechanically attached to the cover surface 31 on the interior of the cell housing 3.

In the present case, the first spacer 67 is configured in a one-piece arrangement with the holder 100 according to the fourth form of embodiment. The first spacer 67 is thus partially arranged on the first frame element 101 and on the second frame element 102. By the assembly of the first frame element 101 with the second frame element 102, the complete first spacer 67 is formed accordingly.

A second spacer 68 is arranged between the second collectors 51 and the cover surface 31 of the cell housing 3. The second spacer 68 is formed of a non-electrically-conductive material, specifically of a plastic, and electrically insulates the second collectors 51 from the cover surface 31 of the cell housing 3. The second spacer 68 is thus mechanically attached to the cover surface 31 on the interior of the cell housing 3.

In the present case, the second spacer 68 is configured in a one-piece arrangement with the holder 100 according to the fourth form of embodiment. The second spacer 68 is thus partially arranged on the first frame element 101 and on the second frame element 102. By the assembly of the first frame element 101 with the second frame element 102, the complete second spacer 68 is formed accordingly.

It is also conceivable that the unrepresented second collectors 51 are directly connected to the electrically-conductive cell housing 3, specifically to the cover surface 31 of the cell housing 3. The positive terminal 12 is electrically connected to the cover surface 31. In this case, no additional insulator is required between the second collectors 51 and the cell housing 3.

Figure 12:
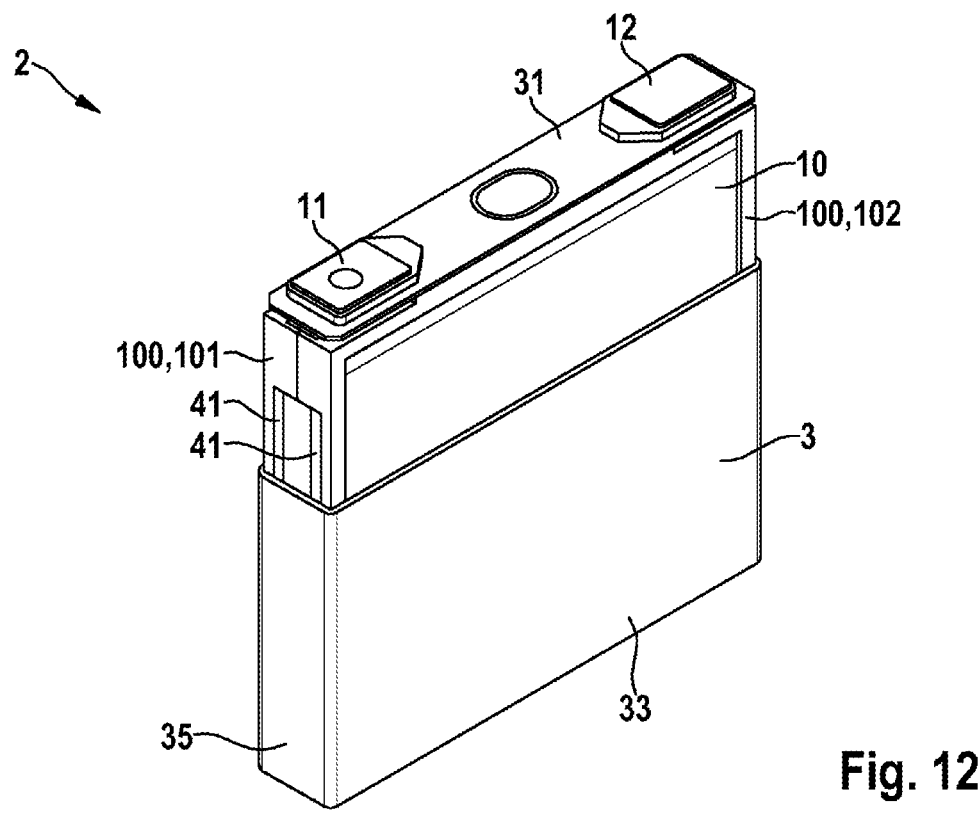
FIG. 12 shows a schematic perspective representation of the battery cell represented in FIG. 11 in the assembly of the cell housing.

FIG. 12 shows a schematic perspective representation of the battery cell 2 with the holder 100 according to the fourth form of embodiment, with the cell housing 3 assembled.

By the assembly of the first frame element 101 with the second frame element 102, the holder 100 according to the fourth form of embodiment is formed, which accommodates the electrode coil 10 between its frame elements 101, 102. The assembled unit thus formed, which comprises the holder 100 according to the fourth form of embodiment, the electrode coil 10 and the cover surface 31, is then inserted in a container which, in combination with the cover surface 31, forms the cell housing 3.

The cell housing 3 of the battery cell 2 can also be formed of an electrically-insulating material, for example plastic. The cell housing 3 of the battery cell 2 can likewise be coated with an electrically-insulating material. In these cases, no insulators are required between the first collectors 41 and the cell housing 3, and between the second collectors 51 and the cell housing 3.

The invention is not limited to the exemplary embodiments described and the aspects highlighted therein. Rather, within the scope indicated by the claims, a plurality of variations are possible, which lie within the practice of a person skilled in the art.

The invention claimed is:

1. A battery cell (2) comprising:
   a prismatically-designed cell housing (3) having front surfaces (33, 34), and a cover surface (31), on which a negative terminal (11) and a positive terminal (12) are arranged, and
   at least one electrode coil (10) arranged within the cell housing (3) and having a cathode (14) and an anode (16), wherein the at least one electrode coil (10) is fastened to the cover surface (31) by means of an electrically-insulating holder (100),
   wherein the holder (100) is configured in the form of a double frame, and includes a first frame element (101) including at least one electrically-insulating spacer (67, 68) and a separate second frame element (102) including another at least one electrically-insulating spacer (67, 68), between which the at least one electrode coil (10) is accommodated, and
   wherein the frame elements (101, 102) each have an opening directly adjacent a respective front surface (33, 34) of the cell housing.

2. The battery cell (2) as claimed in claim 1, wherein the spacers (67, 68) are fastened to the cover surface (31).

3. The battery cell (2) as claimed in claim 2, wherein the spacers (67, 68) are secured to the cover surface (31) by a collector (41, 51), which electrically connects the cathode (14) or the anode (16) to the terminal (11, 12).

4. The battery cell (2) as claimed in claim 1, wherein the at least one electrode coil (10) is disposed within and between the first frame element (101) and the second frame element (102).

5. The battery cell (2) as claimed in claim 4, wherein the at least one electrode coil (10) is wound around a winding axis (A), which is oriented in parallel with the cover surface (31).

6. The battery cell (2) as claimed in claim 1, wherein the holder has a cover region (81), which is connected to the spacers (67, 68), and a base region (82), which is connected to the cover region (81), and in that the at least one electrode coil (10) is held between the cover region (81) and the base region (82).

7. The battery cell (2) as claimed in claim 1, wherein the at least one electrode coil (10) is surrounded by the frame elements (101, 102), the frame elements each extending about an entirety of respective opposing sides of the at least one electrode coil (10).

8. The battery cell (2) as claimed in claim 1, wherein the first frame element (101) and the second frame element (102) surround an entirety of the at least one electrode coil (10) of the battery cell.

9. The battery cell (2) according to claim 8, wherein the at least one electrically-insulating spacer (67, 68) of the first frame element (101) and the at least one electrically-insulating spacer (67, 68) of the second frame element (102) are form fit, and the first frame element and the second frame element are retained in a form-fitting manner.

10. The battery cell (2) according to claim 1, wherein the cathode (14) includes cathode contact lugs (24) and the anode (16) includes anode contact lugs (26).

11. The battery cell (2) according to claim 10, wherein the cathode contact lugs (24) are each a different length prior to connection with a collector (51).

12. The battery cell (2) according to claim 1, wherein the first frame element (101) and the second frame element (102) extend the length and the width of the at least one electrode coil (10), wherein the first frame element (101) and the second frame element (102) enclose the at least one electrode coil (10).

13. The battery cell (2) according to claim 1, wherein the first frame element (101) includes two of the spacers (67, 68) disposed at an upper edge thereof, and the second frame element (102) includes two of the spacers (67, 68) disposed at an upper edge thereof, and wherein the two spacers (67, 68) of the first frame element project from the upper edge toward the two spacers (67, 68) of the second frame element that project from the upper edge thereof.

14. The battery cell (2) according to claim 13, wherein the first frame element (101) has a rectangular shape and the two spacers (67, 68) each project transversely from the upper edge of the first frame element (101).

* * * * *